United States Patent [19]

Stessen

[11] Patent Number: 4,711,413
[45] Date of Patent: Dec. 8, 1987

[54] TARGET TRACKING ARRANGEMENT

[75] Inventor: Lothar Stessen, Lauf, Fed. Rep. of Germany

[73] Assignee: DIEHL GmbH & Co., Nuremberg, Fed. Rep. of Germany

[21] Appl. No.: 939,539

[22] Filed: Dec. 9, 1986

[30] Foreign Application Priority Data

Jan. 28, 1986 [DE] Fed. Rep. of Germany ....... 3602456

[51] Int. Cl.$^4$ .............................................. F41G 7/26
[52] U.S. Cl. .................................................. 244/3.16
[58] Field of Search ........................ 244/3.16; 102/384

[56] References Cited

U.S. PATENT DOCUMENTS 2,407,936  9/1946  Rost et al. .......................... 244/3.16
3,944,167  3/1976  Figler et al. ........................ 244/3.16
4,286,760  9/1981  Couderc et al. .................... 244/3.16

FOREIGN PATENT DOCUMENTS 79684  5/1983  European Pat. Off. .

Primary Examiner—Charles T. Jordan
Attorney, Agent, or Firm—Scully, Scott, Murphy & Presser

[57] ABSTRACT

A target tracking arrangement which is located in the scanning or search head of a guided airborne body, such as a missile, including a detector located behind a lens arrangement. The arrangement has two rotatable superimposed discs arranged in the path of the beam of the lens arrangement, and which discs are rotatable at different rotational speeds, and possess differently eccentrically extending slits which are transmissive or permeable to beams or rays.

8 Claims, 6 Drawing Figures

TARGET TRACKING ARRANGEMENT

BACKGROUND OF THE INVENTION

1. Field of the Invention

The present invention relates to a target tracking arrangement which is located in the scanning or search head of a guided airborne body, such as a missile, including a detector located behind a lens arrangement.

2. Discussion of the Prior Art

Installations or apparatuses of the type under consideration, which are generally known from the disclosure of European Laid-Open Patent Appln. No. 79 684, are equipped with a search head which can be pivoted with respect to the longitudinal axis of the guided airborne body or missile, in order to scan the target area for the target which it is to be homed onto, and subsequent to acquiring a target, to be able to determine any change in the deviating orientation of the target relative to the longitudinal axis of the missile, so that the missile can be guided onto a target collision course pursuant to the rules of proportional navigation.

The mechanical and electromechanical requirement for a search head which is displaceable or pivotable with respect to the longitudinal axis of the missile is, in any event, extremely high; this requirement can quite readily exceed significantly more than half of the total costs of a simple guided missile.

SUMMARY OF THE INVENTION

Accordingly, it is an object of the present invention to provide an inexpensively produceble but, nevertheless, still operationally dependable device or arrangement of the type under consideration herein, which is especially adapted for utilization in technologically simply equipped guided missiles, in order to be able to significantly reduce their overall costs.

The foregoing object is inventively achieved in that the arrangement of the type under consideration has two rotatable discs arranged in the path of the beam of the lens arrangement, and which discs are rotatable at different rotational speeds, and possess differently eccentrically extending slits which are transmissive or permeable to beams or rays.

In accordance with the foregoing, the target area is scanned spirally in the usual manner for searching after a target and for tracking an acquired target, without requiring a pivotable search head (or a rotating missile with an angled built-in sensor characteristic) for this purpose, inasmuch as the beam or ray-permeable window area, which is obtained from the overlapping of the two slitted diaphragm discs, will periodically wander spirally across the optically effective plane of the lens arrangement, and as a consequence, energy beams or rays will be refracted on the detector along the generatrix of a conical mantle surface with a variable cone opening angle across the lens arrangement. From the momentary setting of the aperture area at the pickup of radiation energy by means of the detector there is resultingly obtained the momentary orientation of the offset of the target which is to be attacked relative to the orientation of the longitudinal axis of the guided missile, from which there can be derived, without any further efforts and in the usual manner, the guidance information for the control of the guided missile pursuant to the rules of proportional navigation.

A correlation between the search viewing field and the conditions of the approach to the target is possible through simply a varying in the focal length of the lens arrangement. A smaller viewing field can be scanned at a higher periodicity, which can be easily achieved through an increase in the difference between the rotational speeds of the two slitted discs. For this purpose, the relationship between the two rotational speeds can be maintained unchanged; in effect, there can be employed a drive unit with a constant transmission ratio, in which simply by means of the drive motor, one of the two output rotational speeds of the drive is varied; for example, the lower rotational speed is increased; whereupon, due to the fixed transmission ratio of the drive, there will then correspondingly follow the other rotational speed.

BRIEF DESCRIPTION OF THE DRAWINGS

Further alternatives and modifications, as well as other features and advantages of the invention may now be readily ascertained from the following detailed description of an exemplary embodiment of the invention, taken in conjunction with the accompanying drawings; in which.

DETAILED DESCRIPTION

Figure 1:
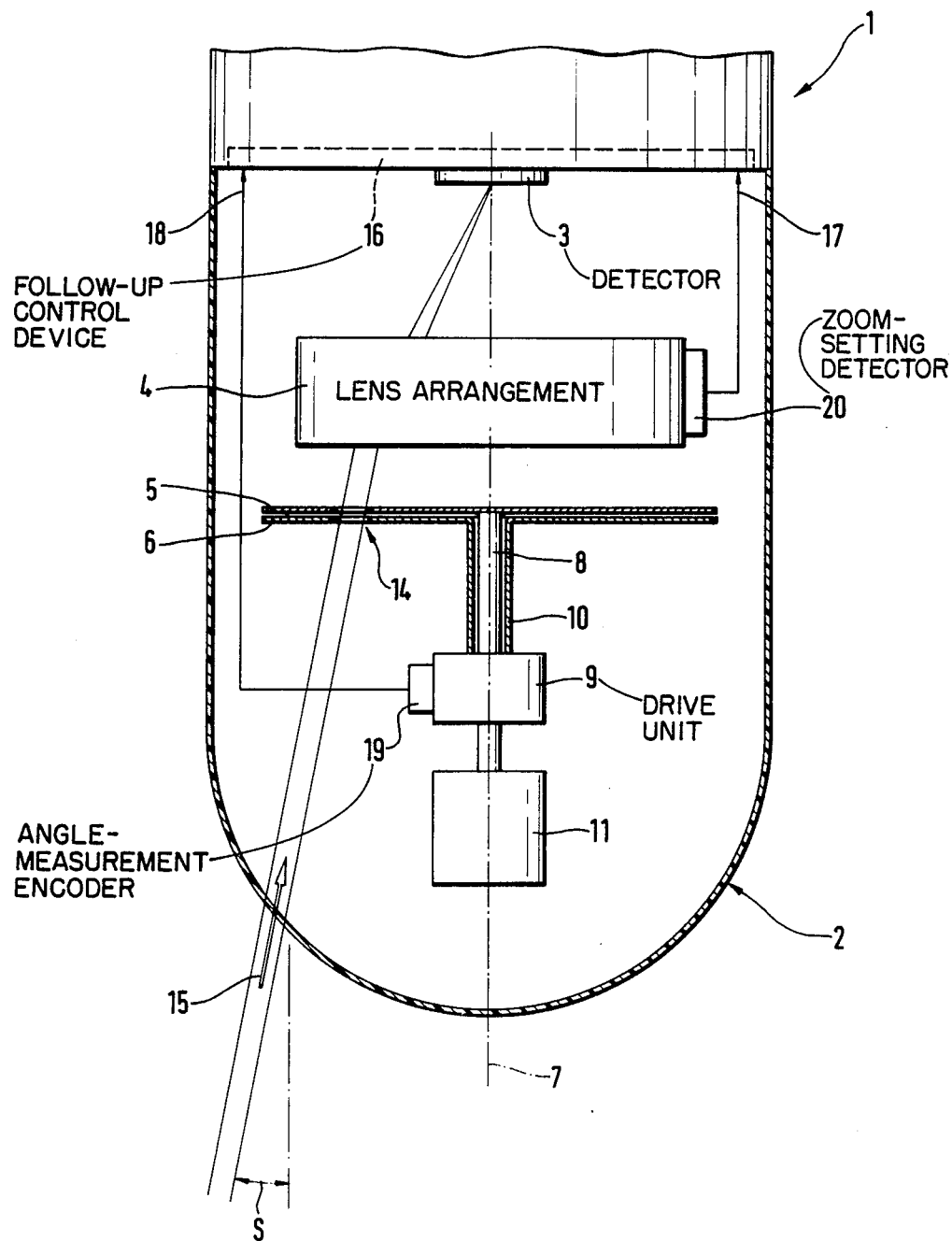
FIG. 1 generally schematically illustrates a longitudinal sectional view of a target tracking arrangement in the head end region of a guided missile.

A guided airborne body or missile 1 pursuant to FIG. 1 possesses a fixed scanning or search head 2. Arranged within this search head is a detector 3, which is designed for the conversion of energy within a certain radiation spectrum, preferably of infrared energy, into electrical signals. Located in the direction of flight ahead of the detector 3 is a lens arrangement for with differently adjustable focal lengths or distances (so-called zoom-lens arrangement), in a concentric relationship with the missile 1 and the detector 3. The focal length can be varied in a stepless or continual mode through a setting device (not shown); basically, however, it is also adequate to provide for a discontinual adjustability between predetermined focal lengths, and even a switching capability between only two defined focal lengths.

Located in front of each other in the direction of flight are two apertured diaphragm discs 5, 6 ahead of the lens arrangement 4, which discs are supported so as to be rotatable about the common axis 7 of the missile 1, the lens arrangement 4 and the detector 3. In order to implement the rotational drive, the diaphragm disc 5 is connected, in the illustrated exemplary embodiment, to a drive unit 9 through a shaft 8, and the other diaphragm disc 6 therewith through a hollow shaft 10 which is coaxial with the shaft 8; which drive unit is, in turn, driven by a motor 11. The shafts 8 and 10 and, consequently, the discs 5 and 6, are driven at different rotational speeds n5, n6 (in effect, with a difference in the speed of rotation of n5−n6 n6=dn), whereby, basically, one of the rotational speeds n can also possess the value zero.

Figure 2:
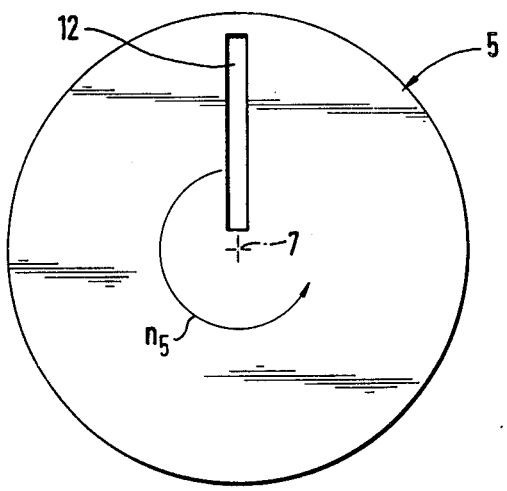
FIG. 2 illustrates an apertured diaphragm disc with a linear-radial slit.
Figure 3:
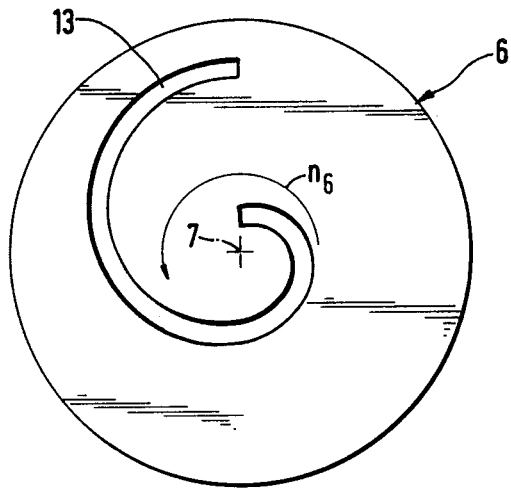
FIG. 3 illustrates an apertured diaphragm disc with a spirally-shaped slit.

The discs 5, 6 possess non-concentrically extending radiation or beam-permeable areas which are different with respect to each other, with (in an axial-parallel view) a mutual intersecting location for these areas. In the illustrated exemplary embodiment, the apertured diaphragm disc 5 possesses a linear radially extending slit 12 (FIG. 2), and the other apertured diaphragm disc 6 possesses a spiral or helical slit 13 which extends over almost 360° (FIG. 3).

Figure 4:
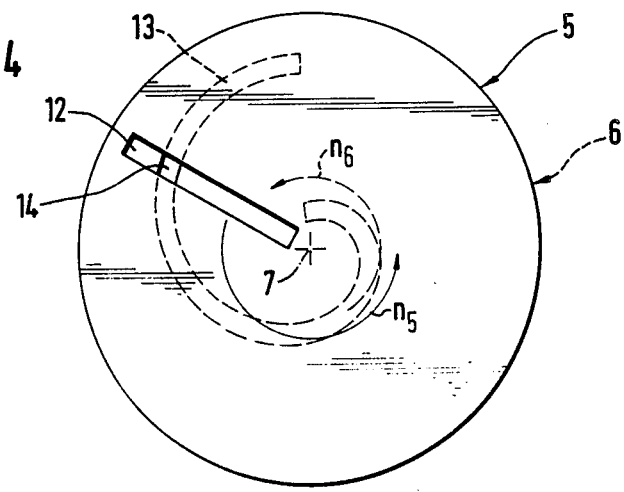
FIG. 4 illustrates a momentary positioning of the two slits pursuant to FIGS. 2 and 3 which define, at their intersecting location, a ray or beam-transmissive opening or window area.

The intersection of the slits is hereinafter designated as a beam or ray-transmissive aperture or window area 14. Due to the difference dn between the rotational speeds of the diaphragm discs 5, 6, the window area 14 wanders periodically peripherally and radially over the effective surface of the lens arrangement 4, whereby the periodicity T of this wandering movement corresponds to the inverse value of the difference dn between the rotational speeds, and the radial direction (from the inside outwardly or from the outside inwardly) to the plus or minus sign of this difference dn between the rotational speeds. The window area 14 thus always commences at the end of a radial outward wandering of the periodicity T at the beginning of the radial movement; as can be ascertained from the illustration in FIG. 4.

The momentary angle S of the optical path of the radiation energy which received by the detector 3 is obtained from the momentarily set focal length or distance of the lens arrangement 4, and from the momentary position 1 of the aperture or window area 14. With the radiation energy 15 received by the detector 3, the latter delivers a signal to a follow-up control device 16, wherein the signal, together with a focal length information 17 and an angle-measurement information 18, is processed into a setting signal for control of guidance elements; for example, aerodynamic guide fins, for implementing the proportional navigation of the guided missile 1, such as is known from the principle of collision course navigation.

When an irradiating target is located in within the angle S of the optical path (FIG. 1), then this radiation energy 15 falls through the aperture or window area 14, and is deflected in the lens arrangement 4 towards the detector 3. From the momentary angular rotational position of the two apertured diaphragm discs 5, 6 which is detectable, for example, at the drive 9 through an angle-measurement encoder 19, there is thereafter obtained the information 18, and from a zoom-setting detector 20, the information 17 with regard to this momentary angle S of the optical path to the detected target.

Figure 5:
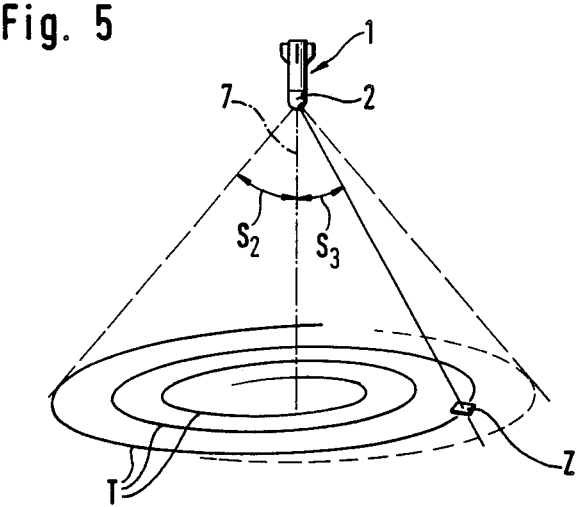
FIG. 5 illustrates a guided missile pursuant to FIG. 1 with a large target searching aperture angle between the longitudinal axis of the missile and the ray or beam path through its lens arrangement.

Upon further rotation of the apertured diaphragm discs 5, 6, the window area 14 and, resultingly, the angle S of the optical path wanders thereby again out of the momentary direction towards the target. After approximately a period T, within which the guided missile 1 (FIG. 5) has traveled over a certain distance in a direction towards the target Z, this target is, however, again detected through the window area 14; namely, at the possibly now changed angle S3 of the optical path due to the target Z which has now wandered out of the collision course bearing. With respect to this angular change in the optical path, the guided missile 1 is then guided on a corrective course, until there is finally attained a constant bearing.

In particular, prior to the detection of a target Z, in essence, when the missile 1 is still at a large distance from the plane of the target movement, there is applied a large focal length or distance to the lens arrangement 4. Then hereby there is obtained a large maximum angle S2 for the optical path (refer to FIG. 5) and, consequently, a large spirally scanned surface in the plane of target movement. At the presence of a large scanning surface, in effect, lengthy spiral or helical paths being subtended in the plane of the target area, it is the intention to obtain a small difference dn in the rotational speeds between the movement of the apertured diaphragm discs 5, 6; in effect, a slowest possible scanning movement of the aperture or window area 14 which, however, nevertheless still produces a gapless scanning of the target area within the greatest obtained radius; otherwise the signal processing installation can be overloaded by the volume of the sensor informations.

Figure 6:
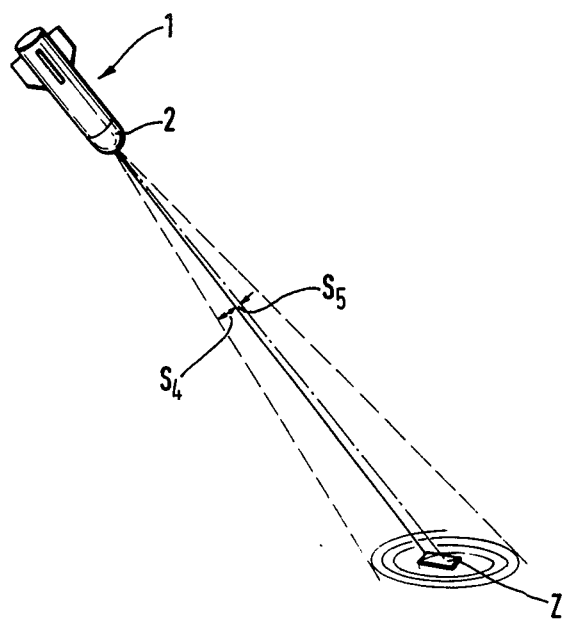
FIG. 6 illustrates a guided missile pursuant to FIG. 5; however, subsequent to target detection with a small aperture angle for the aiming-target tracking guidance (proportional navigation).

When, at an instance, there is detected a target Z in the target plane within an angle S3 of the optical path (FIG. 5) and the guided missile 1 is homed onto generally a direction towards this target Z (FIG. 6), then the focal length of the lens arrangement 4 can be reduced to a smaller vertex angle for the optical path, as a result of which there are avoided malfunctions due to disruptive and dummy targets which are offset from the acquired target Z. Due to the thereby smaller scanning surface within the target area, there can be increased the frequency f = 1/t of the movement of the window area 14 through an increase in the difference dn of between the rotational speeds. This leads to a larger quantity of information with respect to the rapid subsequently acquired target object, and thereby provides the possibilities of obtaining a classification of the target object.

Pursuant to the rules of proportional navigation, there is carried out a guidance of the guided airborne body or missile 1, until this periodically assumed angle S5 of the optical path becomes constant over a period of time, inasmuch as there is then given the collision course towards the target Z.

Thus, through the utilization of the inventive target tracking arrangement there is facilitated a determination of the respective angle of the optical path, and thereby the rotational speed of the optical path within the inertial system; in effect, the recovery of information for implementing the guidance onto the collision course, essentially without any need for a rotating guided airborne body, and without the need for an expensive follow-up search head, at technologically simple correlating capabilities of the mode of operation of the target tracking arrangement to the conditions of the approach to the target area.

What is claimed is:

1. A target tracking arrangement located in a search head of a guided missile; comprising a detector; a lens arrangement, said detector being positioned behind said lens arrangement; two superimposed rotatable discs rotating at different rotational speeds being interposed in the optical path of said lens arrangement, said discs possessing different eccentrically extending radiation-penetratable slits.

2. A target tracking arrangement as claimed in claim 1, wherein said lens arrangement possesses an adjustable focal length.

3. A target tracking arrangement as claimed in claim 1, comprising means for imparting variable rotational speeds to said discs.

4. A target tracking arrangement as claimed in claim 3, wherein said means comprises a drive for the rotation of said discs, at a fixed rotational speed ratio.

5. A target tracking arrangement as claimed in claim 1, wherein a first one of said discs includes a substantially radially extending slit.

6. A target tracking arrangement as claimed in claim 5, wherein a second one of said disc includes a spirally extending slit along an arc of about 360°.

7. A target tracking arrangement as claimed in claim 1, comprising an angle-measurement encoder to impart information over the momentary position of the intersecting area of the two slits of said discs.

8. A target tracking arrangement as claimed in claim 2, wherein said lens arrangement comprises a zoom-lens arrangement; and a position encoder for the delivery of information over the momentarily set focal distance of said zoom-lens arrangement.

* * * * *